United States Patent Office 2,902,362
Patented Sept. 1, 1959

2,902,362

PLUTONIUM-URANIUM ALLOY

Fred W. Schonfeld and Arthur S. Coffinberry, Los Alamos, N. Mex., assignors to the United States of America as represented by the United States Atomic Energy Commission No Drawing. Application April 10, 1957
Serial No. 652,068

6 Claims. (Cl. 75—122.7)

This invention relates to alloys of plutonium and in particular to alloys of plutonium which may be used as nuclear reactor fuels.

Although uranium 235 has generally been used as the fuel or active material in nuclear reactors, in certain nuclear reactor applications it is more desirable to use plutonium as the active material. This is particularly true when the neutronic reactor is to operate with a neutron flux of fast or epithermal energies, such as, for example, the fast plutonium reactor described in AEC Report LA–1679.

Some nuclear reactors, in addition to providing a useful neutron or heat flux, provide a means for creating new active material or fuel within the reactor. These are known as breeder reactors. In a breeder reactor, the breeding ratio depends upon the excess of the number of neutrons born over the number lost in capture including fission, and assuming no leakage, so that:

$$R = \text{breeding ratio} = \frac{\nu - 1 - \alpha}{1 + \alpha} \quad (1)$$

where $R > 1$ for useful breeding, where $\nu$ = average number of neutrons per fission and $\alpha = \sigma_c/\sigma_f$ where $\sigma_c$ = capture cross section
$\sigma_f$ = fission cross section

TABLE I

|  | $U^{235}$ | R | $Pu^{239}$ | R |
|---|---|---|---|---|
| $\nu$ | 2.5 |  | 2.9 |  |
| $\alpha$ (slow neutrons: .03 ev.) | .185 | 1.11 | .540 | 0.883 |
| $\alpha$ (epithermal neutrons: 1 ev.) | .250 | 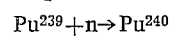~1.00 | .305 | 1.22 |

When the values of Table I are inserted in Equation 1, it can be seen that in a reactor operating with thermal neutrons, $U^{235}$ is suitable as a breeder fuel but $Pu^{239}$ is not, as $\alpha$ for $U^{235}$ at thermal energies is low enough to provide a breeding ratio (R) greater than 1. However, at epithermal energies, $Pu^{239}$ is suitable as a breeder fuel as $\alpha$ for $Pu^{239}$ is low enough to provide an $R > 1$, and as can be seen by Table I, $U^{235}$ is not suitable.

It may be seen then, that the breeding ratio for $Pu^{239}$ in the epithermal range may be considerably greater than 1 but is barely 1 for $U^{235}$. Since a breeding ratio must be appreciably greater than 1 to be useful, $U^{235}$ is not practical as an epithermal reactor breeder core material.

Pure plutonium may be used in a non-breeder fast reactor but its use has several disadvantages. One of the disadvantages of the use of pure plutonium is that the plutonium is consumed during the operation of the reactor and the fuel element must be replaced or reprocessed periodically as a certain percentage of the plutonium is "spent." Another disadvantage to the use of pure plutonium is that all of the heat is generated in a small volume of material with attendant difficulties of cooling.

In order to reduce the intensity of heat generation in the plutonium, the use of diluents with plutonium has already been suggested but other problems occur. When most diluents are added to plutonium, the neutrons tend to be moderated, thus increasing the parasitic capture in plutonium 239 to form plutonium 240. Furthermore, diluents have also been found to create competing neutron reactions which also decrease the effectiveness of the reactor for breeding. Likewise, from a metallurgical standpoint, such alloys of plutonium commonly have phase structures which give the metal undesirable properties.

When $Pu^{240}$ is formed in a fast reactor it adds to the reactivity as it is a fast fission material. However, $Pu^{240}$ in a reactor whose neutrons have been slowed down acts as a non-fissile material, since it increases non-fission capture. Thus, the neutrons captured in producing $Pu^{240}$ in a thermal reactor are lost to the fissile system.

However, in a fast breeder reactor, new plutonium atoms created in uranium add to the reactivity of the reactor. The uranium in such a reactor may be integral in the plutonium core or surround the core as a blanket. The ratio of uranium to plutonium may vary over wide ranges for operative reactors. Thus, the percentage of uranium may be up to 90% and still achieve a practical breeding efficiency.

Since the parasitic capture of neutrons in the reaction $$Pu^{239} + n \rightarrow Pu^{240}$$

increases with a decrease of neutron energy, the reactor core must contain materials which will not appreciably moderate fast neutrons. $U^{238}$ is allowable up to about 90% of the plutonium-uranium ratio.

Binary alloys of uranium and plutonium have been produced but they possess very bad characteristics for fabrication, machining, casting and corrosion resistance. These alloys are brittle and glass-like, cannot be cast without many minute cracks and are found to corrode readily. The poor qualities of the uranium-plutonium alloys may be attributed to the presence of the zeta phase. Further, a plutonium-uranium binary alloy is very subject to corrosion in gaseous or aqueous environment.

It is therefore an object of the present invention to provide an alloy containing uranium and plutonium which can be cast or fabricated free of cracks.

Another object of the present invention is to provide an alloy containing uranium and plutonium which is relatively resistant to corrosion.

Another object of the present invention is to provide an alloy containing plutonium and uranium which has not more than one-half zeta phase by volume.

Another object of the present invention is to provide an alloy containing uranium and plutonium which may be used as the fuel element in a fast breeder reactor.

The objects of this invention are attained by the production of a multicomponent alloy in which the plutonium to uranium ratio is between 10 to 50 atoms of plutonium and 90 to 50 atoms of uranium, said alloy containing 7 to 40 atomic percent of a metal selected from the class consisting of iron and cobalt.

By this invention alloys of plutonium, uranium and at least a third element may be produced which either eliminates the zeta phase or reduces its amount so that the alloys are machinable, easy to fabricate and may be cast free of cracks.

The metallurgical properties of the alloys of this invention make it a practical, workable material having desirable neutronic, as well as mechanical, characteristics for use in nuclear reactors.

In particular, iron, cobalt, nickel and manganese do not substantially moderate fast or epithermal neutrons nor do they show any substantial parasitic neutron capture for neutrons having energies greater than about .03 e.v., i.e., thermal neutrons.

The uranium in the alloy will be converted to plutonium while the fast reactor operates, thus "spent" fuel is automatically replaced and at the same time the volume of the plutonium-containing material will be larger than pure plutonium to facilitate cooling.

Instead of the usual brittle alloy full of minute cracks, the subject alloys can be machined with relative ease and are easy to fabricate. The casting properties are excellent as sound crack-free castings are easily made. The alloys are also more resistant to radiation damage than the binary plutonium-uranium alloy.

Nuclear reactors in which the alloys of the present invention are particularly useful as fuels are well-known in the art. For example, AEC Report LA–1679, declassified March 11, 1957, the subject matter of which is incorporated herein by reference, describes a fast reactor in which the alloys of the present invention could be used.

The alloys of this invention are prepared by any one of several methods. They may be prepared by melting the weighed amounts of the constituents in a vacuum induction furnace whereby the metals are mixed through the stirring action of the induction field. Alternately pure iron or cobalt or halides of these metals can be added to a mixture of plutonium fluoride and uranium fluoride and the alloy produced by co-reduction of the fluorides using the technique given in the co-pending application Ser. No. 543,630, by Richard D. Baker, filed October 28, 1955, entitled "Recovery of Metals of the Second Rare Earth Series From Scrap," the subject matter of which is incorporated therein by reference. In addition to the methods suggested, any methods used in the art for preparing plutonium or uranium alloys may be used for preparing the alloy of the present invention.

In the alloys of the present invention, the preferred phase has a tetragonal crystal structure of the $U_6Mn$ type. A structure of this type is formed when the total uranium and plutonium is 85.7 atomic percent of the alloys of the present invention. Thus the remaining 14.3 atomic percent consists of either iron or cobalt or a mixture composed primarily of these elements together with a small quantity of nickel and/or manganese. The above d-transition metals can be added in less or more percentage than the preferred 14.3 atomic percent to also improve the plutonium-uranium alloy. When from 7 to 14.3 percent of the d-transition elements are added, some zeta phase remains; however, the tetragonal structure will be present in sufficient quantity to greatly improve the metallurgical properties of the alloy. Less than 7 percent of the d-transition elements does not result in such advantages. When more than 14.3 atomic percent of the above d-transition elements are added to the plutonium-uranium alloy the excess will form other intermetallic compounds in such a way as to yield metallurgically useful alloys. However, more than 40 percent results in an alloy which requires a large mass for a critical assembly. If iron is present as the predominant d-transition element, sufficient compound of the $U_6Mn$ type will be present to insure the desired properties. When cobalt is present as the predominant d-transition element other compounds will form either in addition to or instead of the $U_6Mn$ type, and these compounds will have the desired properties.

Example I

In preparing an iron-containing alloy of the preferred embodiment, 51.2 grams of plutonium, 153.0 grams of uranium and 8.0 grams of iron are weighed out and the mixture is placed in a magnesia crucible in a vacuum or inert atmosphere, heated by induction furnace means to at least about 1000° C. and kept at this temperature for at least 5 minutes. During this time the melt is continually stirred by the action of the induction field. Then the alloy is either poured in a mold or allowed to cool in the crucible.

Example II

In preparing an iron-containing alloy of the preferred embodiment by co-reduction of the metal containing halides, 68 grams of $PuF_4$, 202 grams of $UF_4$, 8 grams of Fe, 96 grams of calcium and 65 grams of iodine are weighed out and the mixture is placed in a magnesia crucible. The interior of the crucible is either evacuated or filled with an inert gas and then the contents are heated by induction furnace means to 300° C. The calcium combines with the fluorine and the alloy flows to the bottom of the crucible wherefrom it may be removed by cracking the crucible after the alloy and newly formed $CaF_2$ have cooled.

Example III

In preparing a cobalt-containing alloy of the preferred embodiment 51.2 grams of Pu, 153.0 grams of U and 8.42 grams of cobalt are weighed out and the mixture is placed in a magnesium oxide crucible in a vacuum or inert atmosphere, heated by induction furnace means to at least about 1000° C. and kept at this temperature for at least 5 minutes. After this time, during which the melt is stirred by the action of the induction field, the alloying is complete.

Example IV

In preparing a nickel-containing alloy of the present invention, 51.2 grams of plutonium, 153.0 grams of uranium and 8.38 grams of nickel are weighed out and the mixture is placed in a magnesia crucible in a vacuum or inert atmosphere, heated by induction furnace means to at least about 1000° C. and kept at this temperature for at least 5 minutes. During this time the melt is continually stirred by the action of the induction field. Then the alloy is either poured in a mold or allowed to cool in the crucible.

Example V

In preparing a manganese-containing alloy of the present invention, 51.2 grams of plutonium, 153.0 grams of uranium and 7.85 grams of manganese are weighed out and the mixture is placed in a magnesia crucible in a vacuum or inert atmosphere, heated by induction furnace means to at least about 1000° C. and kept at this temperature for at least 5 minutes. During this time the melt is continually stirred by the action of the induction field. Then the alloy is either poured in a mold or allowed to cool in the crucible.

Example VI

In preparing an alloy containing all of these third elements, for example, 51.2 grams of plutonium, 153.0 grams of uranium, 4.0 grams of iron, 2.1 grams of cobalt, 1.0 gram of nickel, and 1.0 gram of manganese are weighed out and the mixture is placed in a magnesia crucible in a vacuum or inert atmosphere, heated by induction furnace means to at least about 1000° C. and kept at this temperature for at least 5 minutes. During this time the melt is continually stirred by the action of the induction field. Then the alloy is either poured in a mold or allowed to cool in the crucible.

Other embodiments to this invention may be apparent to those skilled in the art and therefore this invention is not limited by the foregoing specification, but only by the appended claims.

What is claimed is:

1. A neutronic reactor fuel alloy consisting essentially of from 7 to 40 atomic percent of at least one of the elements selected from the class consisting of iron and cobalt with the remainder uranium and plutonium in the ratio of from 90 to 50 atoms of uranium to 10 to 50 atoms of plutonium, the predominant phase constituent of said alloy having a tetragonal crystal structure of the $U_6Mn$ type.

2. A neutronic reactor fuel alloy consisting essentially of from 7 to 40 atomic percent cobalt with the re- uranium and plutonium in the ratio of from 90 to 50 atoms of uranium to 10 to 50 atoms of plutonium, the predominant phase constituent of said alloy having a tetragonal crystal structure of the $U_6Mn$ type.

3. A neutronic reactor fuel alloy consisting essentially of from 7 to 40 atomic percent cobalt with the re- mainder uranium and plutonium in the ratio of from 90 to 50 atoms of uranium to 10 to 50 atoms of plutonium, the predominant phase constituent of said alloy having a tetragonal crystal structure of the $U_6MN$ type.

4. A neutronic reactor fuel alloy consisting essentially of 14.3 atomic percent of at least one of the elements selected from the class consisting of iron and cobalt with the remainder uranium and plutonium in the ratio from 90 to 50 atoms of uranium to 10 to 50 atoms of plu- tonium, said alloy having no more than one-half zeta phase by volume.

5. A neutronic reactor fuel alloy consisting essentially of 14.3 atomic percent iron with the remainder uranium and plutonium in the ratio from 90 to 50 atoms of uranium to 10 to 50 atoms of plutonium, said alloy hav- ing no more than one-half zeta phase by volume.

6. A neutronic reactor fuel alloy consisting essentially of 14.3 atomic percent cobalt with the remainder uranium and plutonium in the ratio from 90 to 50 atoms of uranium to 10 to 50 atoms of plutonium, said alloy hav- ing no more than one-half zeta phase by volume.

References Cited in the file of this patent

UNITED STATES PATENTS 2,574,627   Daane et al. _____ Nov. 13, 1951

OTHER REFERENCES

Baenziger et al.: USAEC Document AECD–2598, de- classified May 25, 1949, 15 pages.

Finniston et al.: Progress in Nuclear Energy, Series V, "Metallurgy and Fuels," publ. 1956 by McGraw-Hill Book Co., Inc., N.Y., pages 396–409.